Feb. 6, 1968    A. L. LUDWIG    3,366,989
WINDSHIELD WIPER ARMS
Filed Oct. 22, 1965    2 Sheets-Sheet 1
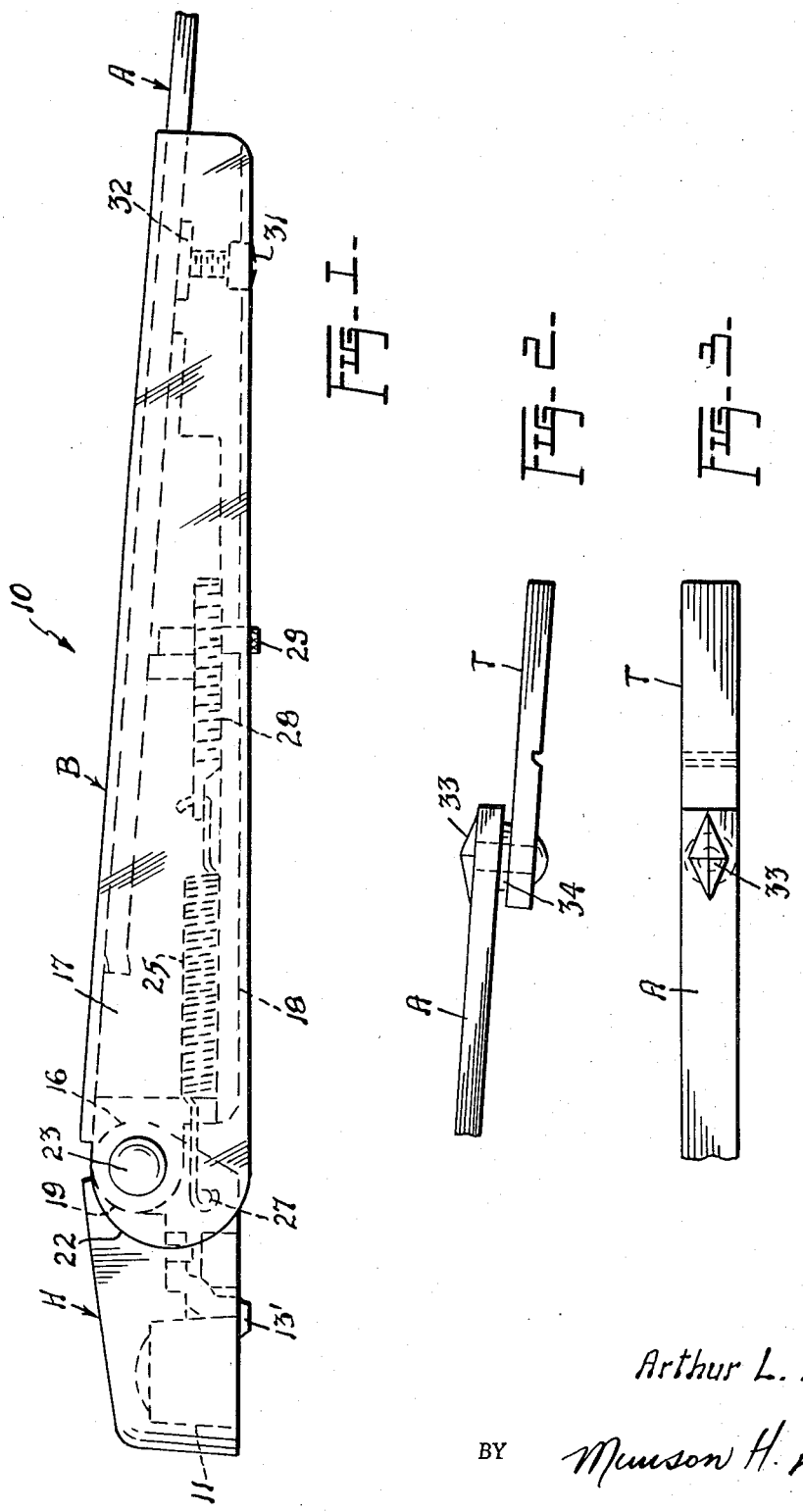
INVENTOR
Arthur L. Ludwig
BY Munson H. Lane
ATTORNEY

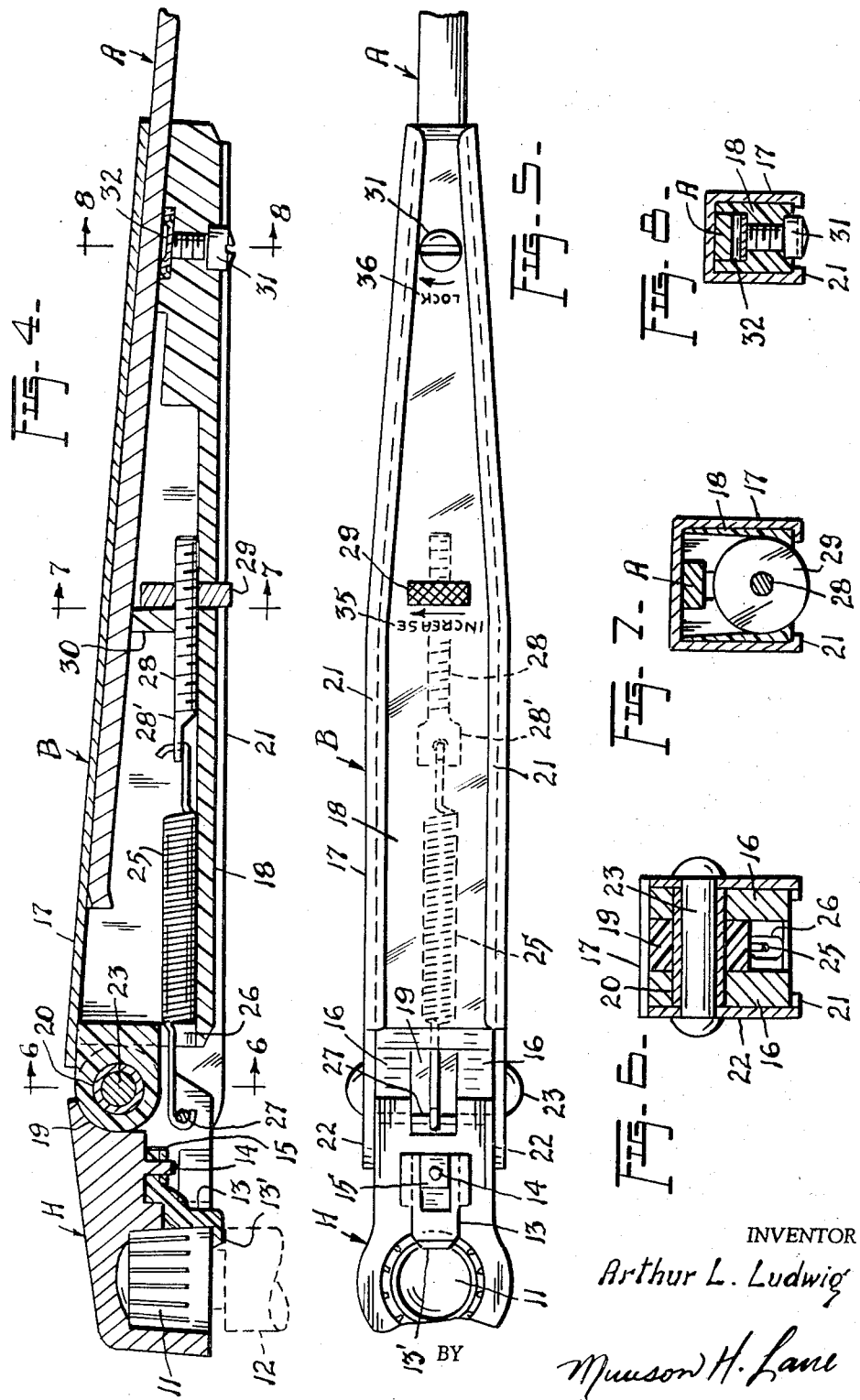

United States Patent Office 3,366,989
Patented Feb. 6, 1968

3,366,989
WINDSHIELD WIPER ARMS
Arthur L. Ludwig, Hastings, Mich., assignor to Hastings Manufacturing Company, Hastings, Mich., a corporation of Michigan
Filed Oct. 22, 1965, Ser. No. 501,665
9 Claims. (Cl. 15—250.2)

This invention relates to new and useful improvements in windshield wiper arms, and the principal object of the invention is to provide a wiper arm of a simple construction which may be easily fabricated and assembled and which is particularly sturdy in resisting tendencies to twist when traversing a windshield.

As such, the wiper arm of the invention is equipped with what may be called a composite body, comprising a metallic hood and a plastic filler contained within the hood. Without the conventional necessity of using a body of heavy gauge metal, the composite body of the invention utilizes the rigidity of a light-weight plastic filler to reinforce the hood which may therefore be made of light metal stock. Moreover, the body is connected to the head of the wiper arm through the medium of the filler rather than of the hood, so that the filler rather than the hood absorbs the strain of the operative connection between the body and the head.

As another feature, the filler accommodates a tension spring anchored to the arm head, and adjustable means for tensioning the spring, it being possible to assemble the arm head, filler and spring with its tensioning means in a convenient manner before the hood is installed to complete the assembly.

As another feature, the composite body accommodates in the filler a slidably adjustable base arm and means for locking the same in an adjusted position, the effective length of the base arm thus being variable to suit different installations.

As a further feature, the arm head of the invention is provided with improved means for locking the same in position on a driver, particularly from the standpoint of bias in a radial direction.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is a side elevational view of a windshield wiper arm of the invention, the outer end portion of the base arm being broken away;

FIGURE 2 is a fragmentary side elevational view of the outer end portion of the base arm with its arm tip;

FIGURE 3 is a fragmentary top plan view of the subject shown in FIG. 2;

FIGURE 4 is a longitudinal sectional view of the wiper arm shown in FIG. 1;

FIGURE 5 is an underside plan view thereof;

FIGURE 6 is a cross-sectional veiw, taken substantially in the plane of the line 6—6 in FIG. 4;

FIGURE 7 is a cross-sectional view, taken substantially in the plane of the line 7—7 in FIG. 4; and FIGURE 8 is a cross-sectional view, taken substantially in the plane of the line 8—8 in FIG. 4.

Referring now to the accompanying drawings in detail, the windshield wiper arm of the invention is designated generally by the reference numeral 10 and comprises three primary units, namely, an arm head H, an arm body B and a base arm A.

The arm head H may assume the form of a metallic casting provided with a socket 11 for reception of a conventional arm driver, the shaft of which is indicated by the dotted lines 12 in FIG. 4. The socket 11 is internally toothed to fit grooves or serrations usually provided in the driver, and a head lock 13 is mounted within the head H for retaining the head in position on the driver. The lock 13 includes the usual lip 13' projecting into a groove in the driver shaft 12, and the lock is held in place in the head H, as by a stud 14 and spring clip 15. It is significant to note that a side portion of the socket 11 is open and that the lock 13 is disposed in this open side portion of the socket so that it may engage the side of the driver in the socket. The lock 13, which may be formed from material such as "Nylon," has inherent resiliency by which it is biased radially inwardly toward and against the driver in the socket 11, thus assuring that positive engagement is afforded between the socket teeth and the driver serrations at the side of the driver opposite to the lock. It will also be noted that the head H is bifurcated to provide a pair of transversely spaced, apertured ears 16 for connection to the wiper arm body B, as will be hereinafter described.

The body B is a composite body, comprising an elongated, channel-shaped hood or shell 17 of relatively thin metal, and an elongated filler 18 which is contained within the hood 17 and which may conveniently be made of plastic material, as for example, rigid vinyl or polycarbonate. The filler 18 extends the full length of the hood 17 and projects outwardly from one end of the hood in the nature of an apertured ear 19 which is interposed between the ears 16 of the head H, as will be apparent. A tubular bushing 20 extends through the registering apertures in the ears 16, 19, 16, whereby the filler 18 is pivotally or hingedly connected to the head H.

Except for the ear 19, the entire filler 18 is encased by the hood 17 and the hood is equipped with a pair of inturned flanges 21 which underlie the bottom of the filler to retain the hood in position. Also, the hood is provided with a pair of apertured ears 22 which straddle the ears 16 of the head H, as will be apparent from FIGS. 1 and 5. A rivet 23 extends through the bushing 20 and has its heads at the outside of the ears 22 of the hood 17, this serving to prevent movement of the hood 17 longitudinally of the filler 18 rather than to connect the body B to the head H. As already noted, connection of the body to the head is effected by the bushing 20 passing through the ears 16, 19 and in that manner it is the filler 18 rather than the hood 17, which absorbs the strain of the operative connection between the body and the head when the device is in use.

The filler is provided with a chamber 24 accommodating a tension spring 25, one end portion of which projects through an opening 26 in the end of the filler 17 for anchorage to a pin 27 which extends transversely between the ears 16 of the head H. The other end of the spring 25 is connected to an apertured end portion 28' of a screw-threaded tensioning bar or rod 28 which operatively engages an adjusting nut 29. The nut 29 is disposed against a partition 30 within the filler 18, and it will be apparent that when the nut is rotated, the rod 28 will be moved axially so as to increase or decrease the tension of the spring 25. Conveniently, the nut 29 projects through the bottom of the filler 18 and has a knurled periphery so that it may be easily turned with a finger.

The top portion of the filler 18 is longitudinally recessed to slidably receive the base arm A which projects longitudinally outwardly from the body B. By sliding the arm A in the body B, the effective length of the base arm may be adjusted. For the purpose of locking the base arm in an adjusted position, a locking screw 31 is provided in the filler 18, the shank of the screw bearing against a clamping washer 32 which in turn presses against the underside of the base arm A to lock the same in place. It will be apparent that the base arm A directly underlies the top of the hood 17, so that it is pressed against the hood as the locking screw 31 is tightened. Of course, the hood is prevented from lifting off the filler 18 by the hood flanges 21 at the underside of the filler.

A significant feature may be noted at this point concerning the assembly of the wiper arm. After the lock 13 has been installed in the head H, the head may be connected to the filler 18 by passing the bushing 20 through the ears 16, 19. With the spring 25 and its tensioning means 28, 29 in place in the filler 18, the spring may be anchored to the pin 27 in the head H. The lock screw 31 and washer 32 may also be installed in the filler, followed by placement of the base arm A on top of the filler, all this being done prior to installation of the hood 17. The assembly may then be completed by simply passing the hood 17 longitudinally over the filler 18 so that the ears 22 of the hood are aligned with the bushing 20, for reception of the rivet 23 in the bushing and ears 22 to hold the hood 17 in position.

FIGS. 2 and 3 show the outer end portion of the base arm A which is provided with an adjustable arm tip T for attachment of a wiper blade (not shown) to the wiper arm. A rivet 33 extends through the arm B and tip T to pivotally connect the same together in a manner which permits adjustment of the tip angularly relative to the base arm. A suitable friction washer 34 is provided on the rivet 33 between the arm and the tip, whereby to frictionally retain the tip in an adjusted position.

The underside of the filler 18 may be provided with suitable indicia as indicated at 35 and 36 in FIG. 5, for guidance in adjustment of the tensioning nut 29 and locking screw 31, respectively.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In a windshield wiper arm, the combination of an arm head adapted to be mounted on a driver, a composite arm body comprising an elongated channel-shaped hood and an elongated filler disposed within said hood, said filler extending the full length of the hood and projecting outwardly therefrom at one end of the hood, pivot means connecting the projecting portion of said filler to said arm head, a tension spring disposed in said filler and having one end thereof anchored to said arm head at a point offset from said pivot means, tension adjusting means carried by said filler and connected to the other end of said spring, and a base arm secured in and projecting outwardly from said arm body.

2. The device as defined in claim 1 wherein said arm head and said projecting portion of said filler are provided with registering apertures, said pivot means comprising a tubular bushing journalled in said apertures, said hood including apertured ears straddling said arm head in register with the ends of said bushing, and a rivet extending through said bushing and through said apertured ears.

3. The device as defined in claim 1 wherein said channel-shaped hood is provided with inturned flanges in retaining engagement with said filler.

4. The device as defined in claim 1 wherein said filler is formed with a chamber having said spring disposed therein, said tension adjusting means comprising an adjusting nut rotatably mounted in said filler and a screw-threaded tension bar movable axially by said nut, said spring being connected to said tension bar.

5. The device as defined in claim 1 wherein said filler is provided with a longitudinal groove slidably receiving said base arm in underlying relation to said hood.

6. The device as defined in claim 5 together with screw-threaded clamping means provided in said filler and engaging said base arm to lock the same in an adjusted position.

7. The device as defined in claim 1 together with an arm tip at the outer end of said base arm, pivot means connecting said arm tip to the base arm for angular adjustment of the former relative to the latter, and a friction washer on said pivot means for retaining the arm tip in an adjusted position.

8. The device as defined in claim 1 wherein said arm head is provided with a driver receiving socket open at a portion of its side, and a head locking member mounted in the open side portion of the socket in said head, said locking member being biased radially inwardly to urge the head into engagement with a driver in said socket.

9. The device as defined in claim 1 wherein said hood is metallic and said filler is formed from plastic material.

References Cited

UNITED STATES PATENTS

| | | | |
|---|---|---|---|
| 2,027,362 | 1/1936 | Anderson et al. | 15—250.2 |
| 2,156,505 | 5/1939 | Marcolivio | 15—250.2 |
| 2,799,039 | 7/1957 | Oishei | 15—250.2 |
| 3,126,568 | 3/1964 | Wubbe | 15—250.35 |

CHARLES A. WILLMUTH, *Primary Examiner.*